Dec. 30, 1958   H. P. VAN DER KNOOP   2,866,673
AXLE-BLOCK FITTED WITH A CONICAL BEARING, FOR
THE SPECIAL USE IN MOTOR-VEHICLES
Filed Dec. 14, 1955

INVENTOR
H.P. VAN DER KNOOP

BY *Watson, Cole, Grindle & Watson*

ATTORNEYS

United States Patent Office 2,866,673
Patented Dec. 30, 1958

2,866,673

AXLE-BLOCK FITTED WITH A CONICAL BEARING, FOR THE SPECIAL USE IN MOTOR-VEHICLES

Hendrik Pieter van der Knoop, Rotterdam, Netherlands

Application December 14, 1955, Serial No. 553,133

3 Claims. (Cl. 308—207)

This invention relates to anti-friction bearing installations and more particularly to means for supporting an anti-friction bearing on an axle of a motor vehicle or other machine whereby a hub or other instrumentality is in turn supported by the bearing assembly.

Within the broad scope of the invention the anti-friction bearing may be a roller bearing and in its preferred embodiment the rollers are conical.

It is an object of the invention to provide means whereby the roller bearing is fixed in axial relationship with the axle and in a position to support the hub or other part, and in this connection the invention contemplates the provision of a bushing threaded onto the axle, locking means being provided to be firmly fixed to the axle in the position to which it has been threaded.

Assemblies of this general description are already known, but such constructions have the disadvantage that the inner race can rotate relatively to the axle, in particular where wear produced some play between the rollers and the ball races, with the result that such wear will cause play in the inner race and the axle connection as well. This play or lost motion cannot be effectively removed by adjustment.

A particular object of the present invention is to provide an improved construction of bearing assemblies of this kind in which the above mentioned disadvantage is eliminated, and according to the preferred embodiment of the invention the bushing, which is threaded onto the axle, is of an embracing configuration to enclose the inner race of the anti-friction bearing and lock it between a fixed end portion of the bushing and a nut which is adapted to be threaded onto the opposite end of the bushing. This prevents the inner race of the bearing from rotating with respect to the bushing; and no play will arise between these parts. By adjusting the bushing upon the axle and locking it in the proper position, play at other points will be eliminated.

These and other obects of the invention will be apparent when the following specification is read in connection with the accompanying drawings in which certain embodiments of the invention are illustrated by way of example.

Figure 1:
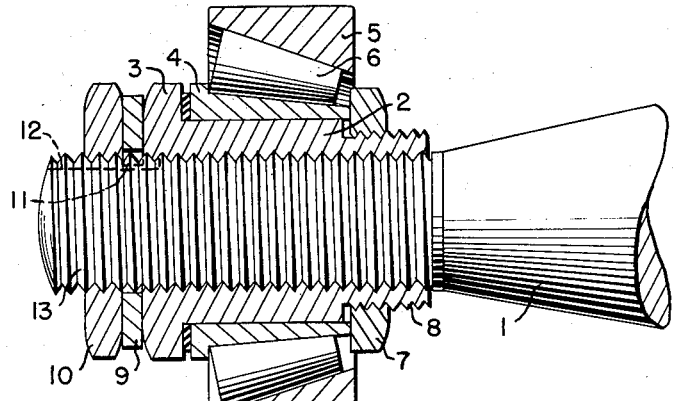
Figure 1 is a longitudinal sectional view of the bearing mounting as applied to an axle.

As seen in the drawings, the cylindrical attenuated end of the axle 1 is screw threaded as at 13 and the internally threaded bushing 2 is screwed onto this end portion of the axle. On the outer periphery of the cylindrical portion of the bushing 2 is fitted the inner race 4 of a conical roller bearing assembly which includes the rollers 6 and the outer race 5 upon which a hub or other supported structure is mounted.

One end of the inner race 4 rests against a flange portion 3 of the bushing 2 which is preferably in the form of a hexagonal nut, or if there is no room for a hexagonal nut, the part 3 may take the form of a round nut having cam slots whereby it may be rotated. The opposite end of the cylindrical portion of the nut 2 is screw threaded as at 8, and a nut 7 is threaded upon this portion and brought to bear firmly against the inner race 4 which forces the other end of the inner race against the flange-nut 3. The inner race 4 is thus locked between the flange 3 and the nut 7 and held firmly in this position.

By cutting the thread at 8 in the direction of rotation of the roller bearing, the nut or ring 7 will, in the normal operation of the bearing, be screwed tighter against the race, and the inner race 4 cannot slip on the cylindrical outer surface of the bushing 2 and wear on the axle itself is out of the question.

To fix the bushing 2 itself upon the axle 1 in the position to which it has been threaded, a ring 9 is employed (shown clearly in Figure 3) which is adapted to abut the outer face of the flange-nut 3 at the end of the bushing 2, the key projection 11 being adapted to enter a groove or keyway 12 formed in the end portion of the axle. A nut 10 is threaded upon the axle and brought to bear frictionally against the ring 9, thus locking the bushing to the ring 9 and the nut 10 firmly together in a position where the keying means 11 prevents rotation of the entire assembly.

It will be clear from the above that this construction provides means for fixing the conical roller bearing in the correct position upon the axle, and any play between the rings and the rollers can be eliminated, whereby rotation of the inner race 4 relatively to the bushing 2 or of the axle is rendered impossible.

Figure 3:
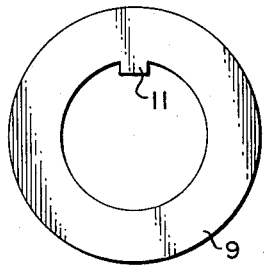
Figure 3 is a side view of a movable locking ring employed in the structure.
Figure 2:
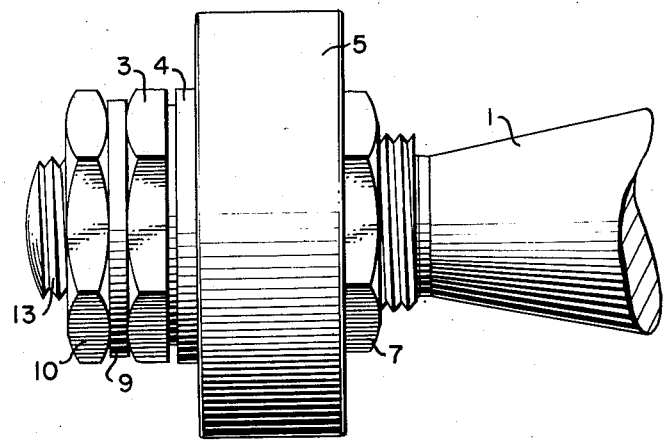
Figure 2 is a view in side elevation of the assemblage.
Figure 4:
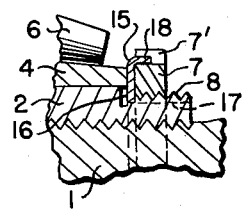
Figure 4 is a fragmentary vertical sectional view of an inward portion of the bearing structure according to another embodiment of the invention.

Although the bearing assembly provided by the present invention has been developed especially for hubs and other parts of motor cars, in which the axle mainly rotates in one direction, the assembly can also be used for other purposes, and in situations where the axle may rotate in either direction. In that case, it is preferable that the nut 7 be secured by a locking ring with inward key projections as shown in Fig. 3, and this ring may also be provided with projecting parts which can be bent around a nut such as the hexagonal nut 7 or, assuming the nut 7 to be circular, the projecting parts may be bent into notches provided in such a nut. See Figure 4 where the nut 7 is provided with a notch 7' and the lock ring 15 is provided with a key portion 16 which enters a slot or keyway 17 formed in the end of the cylinder 2 near the threaded portion 8. If desired, the lock ring 15 may have a portion 18 bent into the notch 7' of the nut 7.

Having thus described the invention, what is claimed as new and desired to be secured by Letters Patent is:

1. An axle and hub anti-friction bearing assembly comprising, in combination, a threaded end portion of an axle, an internally threaded bearing-supporting bushing screwed onto said axle end portion, said bushing comprising a major cylindrical portion externally threaded near one end thereof and a nut-shaped flange portion at the opposite end for the application of a turning tool, an anti-friction bearing assembly carried by said bushing with its inner race snugly surrounding the cylindrical portion of said bushing and abutting at one end the nut-shaped flange portion of the bushing, a nut threaded onto the opposite end of the bushing and abutting the other end of said inner race to lock the race rigidly in place upon the bushing, and means for securing said bushing firmly in the position to which it is threaded upon the axle.

2. The assembly as set forth in claim 1 in which the means for securing the bushing firmly threaded on the axle comprises a longitudinal groove in the axle, a locking ring having keying means thereon cooperating with said groove to permit longitudinal movement of the ring but prevent rotation thereof, a nut threaded on said axle and adapted to be screwed thereon against said ring which in turn is pressed firmly against said bushing, and whereby said bushing, said locking ring, and said last named nut are firmly frictionally locked together and said keying means prevents rotation of the frictionally connected parts.

3. An axle and hub anti-friction bearing assembly comprising, in combination, a threaded end portion of an axle, an internally threaded bearing-supporting bushing screwed onto said axle end portion, said bushing comprising a major cylindrical portion externally threaded near one end thereof and a hexagonal nut-shaped flange portion at the opposite end for the application of a turning tool, an anti-friction conical bearing assembly carried by said bushing with its inner race snugly surrounding the cylindrical portion of said bushing and abutting at one end the inner face of the nut-shaped flange portion of the bushing, a locking nut threaded onto the opposite end of the bushing and abutting the other end of said inner race to lock the race rigidly in place upon the bushing, and means for securing said bushing firmly in the position to which it is threaded upon the axle.

References Cited in the file of this patent

UNITED STATES PATENTS

| 935,648 | Eveland | Oct. 5, 1909 |
| 1,234,080 | Peacock | July 17, 1917 |
| 1,296,021 | Tidmarsh | Mar. 4, 1919 |
| 1,908,743 | Farrell | May 16, 1933 |

FOREIGN PATENTS

| 494,974 | Great Britain | Nov. 4, 1938 |